United States Patent Office 3,128,208
Patented Apr. 7, 1964

3,128,208
WATER DISPERSIBLE AMYLOSE
Benjamin R. Zeitlin, Spring Valley, Anatole Sarko, Irvington on Hudson, and Felix J. Germino, Peekskill, N.Y., assignors to General Foods Corporation, White Plains, N.Y., a corporation of Delaware
No Drawing. Filed Oct. 24, 1961, Ser. No. 147,192
19 Claims. (Cl. 127—67)

This invention relates to amylose preparations, and more particularly to the treatment or modification of amylose to produce a dry product characterized by having improved properties of dispersibility in water and of rapid gel formation. Among other applications the product finds particular use in making convenience foods, such as instant gravies, gel-type puddings, and the like; as a substitute for gelatin; and in making non-food products where hot-water solubility is required, as in paper and textile sizes and coatings.

As is known, amylose is obtained from starch and comprises a linear or open-chain molecule formed from up to about 5000 glucose units attached to each other by end-to-end linkages known as alpha-1, 4-glucosidic bonds. Aqueous solutions of amylose are very unstable, tending to precipitate out (or retrograde) spontaneously to form stable, insoluble crystals of amylose. In the case of solutions containing more than 3% of amylose, the process of retrogradation produces a gel. (By retrogradation is meant the spontaneous precipitation of amylose from a solution of the same to form stable, insoluble crystals, and the crystals are said to be retrograded.) Such precipitated or retrograded amylose cannot be solubilized in water unless autoclaving techniques are used. After autoclaving, the resulting amylose solution, on standing, will again precipitate amylose crystals. Further autoclaving is necessary to solubilize these, and so on. Repeated autoclaving, however, produces undesirable destruction of the amylose chains.

According to the invention, an amylose solution or dispersion produced by autoclaving is subjected to a refrigeration step wherein a moist precipitate of amylose is formed and this is subjected to quick-freezing conditions after which it is freeze dried or lyophilized to produce the product. It has been found that such a product may be dispersed in cold or hot water by simply blending the same therewith, thus eliminating the necessity for further autoclaving. The provision of a cold-water dispersible amylose substantially widens the field of utility of amylose. Not only may the amylose product be dispersed in cold water, but it is also capable of forming heat-reversible gels which, as noted, have application in making gravies, puddings and like products.

It may be noted at this point that aqueous dispersions of the amylose product show mono-particulate matter when examined under the microscope, the term "mono-particulate matter" meaning the presence of separate, approximately 10-micron size particles that are not substantially aggregated to other particles.

Considering the invention in more detail, it comprises first subjecting the amylose starting material to conditions of temperature, pressure, and time sufficient to solubilize it to produce solutions containing at least 1% by weight of amylose, and preferably 1 to 25%. Any amylose may be treated or modified, as described herein, which is substantially hot- and cold-water insoluble. Thus, it may be completely crystalline or amorphous, and it may have had substantially and previous processing. It can have any chain length, and the chain lengths may be substantailly the same or widely different. In some cases, it may have some cold-water solubility, say up to 1% by weight, which, however, is not sufficient to give a gel on standing or cooling. Advantages of the invention are particularly apparent in cases where the starting amylose is completely retrograded, that is, is insoluble in water at any temperature under normal pressure.

The average intrinsic viscosity of the starting amylose is variable, ranging from 1.0 to 5.0, although preferably it is 1.0 to 2.0, and particularly 1.7 to 1.8. It may be added that the intrinsic viscosity of the starting amylose may remain the same during autoclaving or it may decrease owing to degradation. The amylose may be derived from any suitable source including amylose-containing starches such as those from potato, corn, tapioca, sago, wheat, rice, etc. Also, the amylose need not be pure amylose but may have mixed therewith such materials as amylopectin, dextrins, gums, proteins, and the like, all of which are more or less inert to the amylose under the conditions of the autoclaving and subsequent steps. By "inert" materials is meant those that do not react with the amylose and that do not precipitate with it either in the precipitation step to be described or in the subsequent gel-forming step. It is preferred, in the case of these impure amylose materials, that the amylose content thereof shall be at least 60% by weight.

The preferred solubilizing conditions comprise heating the starting amylose at a temperature of 160° C. and a pressure of about 100 p.s.i.g. for a time of up to about 5 minutes. It is not clearly known what occurs to the amylose during such treatment outside of simple disaggregation, although it is believed that some degradation of the molecule takes place, random points in the molecule undergo hydrolysis, some oxidation may occur, etc. Considering such changes, except disaggregation, as a degradation, it is desirable that the extent of the degradation be held to a minimum, as by using as low an autoclaving temperature for as short a time as possible. By "disaggregation" is meant the phenomenon of the breaking up of the agglomerates that are more or less characteristic of amylose without degrading the amylose molecule. These agglomerates are not believed to involve a chemical combination. The extent or amount of the treatment may suitably be measured in terms of the resulting solubility of the amylose undergoing treatment; in other words, the treated amylose should be capable of forming solutions containing about 1 to 25% by weight of amylose, preferably 2 to 10%, or 3 to 6%. The conditions of the treating or solubilization step are variable. Thus, the temperature may range from 300 to 375° F., preferably 310 to 330° F.; the pressure corresponds to the temperature and usually varies from 80 to 140 p.s.i.g.; and the time may be 1 to 60 minutes, preferably 5 to 50 minutes, or 30 to 45 minutes. The foregoing times extend from the beginning of the heating, include a holding period at the desired temperature, and terminate after cooling the material to a desired temperature and removing the same from the autoclave. Holding periods at the desired elevated temperature usually range from 1 to 5 minutes, but can be longer, say up to 30 minutes. As will be understood, these conditions are interdependent. For example, at higher temperatures, the pressure is higher and the time may be lower, etc. Whatever conditions are selected, the resulting product should have a water solubility within the range noted. The autoclaved amylose should also have a minimum intrinsic viscosity in the range of 0.7–1.1.

Although it is indicated that the autoclaved material is a solution, or is solubilized, it will be understood, as described above, that such solution precipitates amylose on cooling.

The hot autoclaved solution is passed directly to a diluting step where it may be coincidently cooled and diluted. Water is added for this purpose, and the solution is preferably diluted to an amylose concentration of about 1% by weight, although the concentration may be 0.5 to 1.5% or even 0.1 to 2%. Within these concentration ranges the solution is non-gelling, that is, when allowed to stand and cool, a gel does not form. Diluting the solution makes it easier to handle and gives a more regular precipitate in the subsequent precipitation step.

The diluted solution is next cooled by subjecting it to refrigeration temperatures, say about 2 to 3° C., for a period of about 2 to 4 days. Such cooling step is designed to precipitate the amylose, in particular a hydrated amylose, it having been found that the use of refrigeration temperatures tends to hasten the precipitation. While it is desirable to cool to temperatures as low as possible without freezing the water, it is also possible to use higher temperatures, in other words, temperatures ranging from just above the temperature of ice formation to room temperature. As may be apparent, the higher the temperature that is used, the longer it will take for the amylose to precipitate. Precipitation may take place in 24 to 240 hours, more usually in 48 to 160 hours, or even 72 to 96 hours. Of interest in this connection is the fact that the longer the precipitation period, the better the yield of amylose and the more uniform the particle size. For the foregoing reasons, slow precipitation is desirable.

The precipitate is separated from the solution in a conventional way, as by centrifuging, filtering, etc. As it is in a moist condition, it may be passed directly to the freezing step which follows, but preferably it is slurried in water, it having been found that a slurry facilitates subsequent uniform freezing and also tends to give a powdery product. In the absence of a slurry there tends to be formed a spongy, friable, cake-like product which, however, is easily powdered.

The moist or slurried precipitate is next subjected to freezing temperatures to solidify quickly the non-bound water content thereof. As may be apparent, the purpose of the freezing step is to solidify all non-bound water prior to its removal in the subsequent lyophilizing step. Quick freezing may be done in any suitable way, as by surrounding the moist precipitate or slurry by liquid nitrogen, a combination of Dry Ice and acetone, etc.

In the lyophilizing step the precipitate is freeze dried to remove the non-bound water. As described below, the removal of the water in this manner leaves a multiplicity of pores or depressions in the amylose which would not be obtained if the precipitate were dried, say, by means of heat. As will be understood, lyophilization does not injure the amylose.

The dry porous amylose product is characterized by having a diffuse crystalline X-ray diffraction diagram, which may be explained as follows. In the quick-freezing step, the hydrated amylose is present in a dilute concentration, and when subjected to the quick-freezing conditions, it crystallizes. The water of hydration also crystallizes in a definite and small crystal size owing to the quick-freezing conditions. Since the water of hydration encompasses the amylose, solid ice crystals are formed which are dispersed throughout the amylose matrix. The subsequent removal of the ice crystals by sublimation in the freeze-drying step creates a very porous material, the pores being extremely small in size and being present throughout the material. When the freeze-dried material is subjected to X-ray diffraction, the beams diffracted from the non-pore-containing parts of the amylose yield a sharp diffraction diagram, whereas the beams diffracted from the pore-containing parts of the amylose create a highly diffused diffraction diagram. The sharp diagram superimposed on the highly diffused diagram yields a so-called diffused crystalline X-ray diffraction diagram, which is indicative of material inherently crystalline and highly porous.

The amylose product has an average intrinsic viscosity of 0.7 to 1.1, and preferably 0.95 to 1.0. The product is a dry, porous, white, free-flowing, fluffy powder comprising spherically-shaped particles having a substantially uniform particle size of about 10 microns. The product is odorless, bland to the taste, has a smooth mouth feel, and is further characterized by being non-hygroscopic, non-toxic, digestable and nutritious.

A small amount of moisture may be present which is usually 1 to 2% by weight but which may be higher, going up to about 10% by weight.

The particles of the amylose product are characterized by their capacity of absorbing water, or hydrating, so to speak, and they tend to swell to a certain degree. The material is said to be hydratable, by which is meant the the tendency of water to be present in all accessible sites in or on the separate particles of the amylose, without preferential formation of water-amylose bonds over amylose bonds. Some of the material probably goes into solution, but most of it does not go beyond the partially swollen, hydrated state. Heat is required to hydrate the particles in aqueous solution, and on cooling, such solution, if the concentration is at least 4% by weight, sets up as a gel. The particles on heating in water do not substantially pass into solution but remain in a hydrated, partially swollen state; the resulting dispersion exhibits mono-particulate matter under the microscope. The gels produced are capable, on reheating and stirring, of appearing to go back into a liquefied state, and this process of gelling and reliquefication can be repeated a number of times.

The amylose is readily dispersible in cold water in a matter of seconds, usually in less than a minute, and in fact, it requires no agitation, and may be described as self-dispersible. It forms a cold water dispersion which is distinctive by being non-clumping. By cold water is meant water at room temperatures and below, for example, down to freezing temperatures, provided a liquid phase is still present. By dispersible is meant the break-down of the amylose powder in water to mono-particulate matter. In hot water the amylose is not only dispersible but also hydratable and partly soluble in concentrations of at least 0.1% by weight and going up to at least 10%. The hot dispersions, in concentrations of at least 4% by weight, spontaneously form a firm, white, semi-opaque, heat-reversible gel on cooling. The product is also dispersible in cold and hot milk, forming gels on cooling of the hot dispersions.

Gels may be formed from dispersions containing 3 to 10% by weight of the amylose product; preferably they are formed from hot water dispersions containing 3 to 5 or 6% by weight of amylose, these latter gels being preferred for use in or as foods. The gels are firm, smooth-textured and heat-reversible and are characterized by their complete lack of grittiness or chalkiness, giving a smooth mouth feel. The higher the concentration of amylose in the dispersion, the faster is the formation if the gel and the firmer is its structure. The gel is a physical type of gel, that is, the amylose forms a gel by virtue of a swelling or water-absorption phenomenon. The gel is readily moldable and demoldable, and after being molded it will retain its shape. It is further characterized by being a short or clean-cutting gel and is relatively non-pasty and non-stringy. In the form of thin layers, say 1 mm. or so in thickness, the amylose gel is colorless and translucent, although in bulk form it is neither translucent nor opaque.

The product is further characterized by exhibiting good stability on storage, being capable of making up into satisfactory gels after storage for several months. Furthermore, it is stable per se or when incorporated in a dry pudding or gravy or other final product mix.

Besides being useful for puddings, the amylose product may serve as a base for instant gravies. It is also suitable as a bacteriological culture base. In some cases it may be employed as a substitute for gelatin, agar, pectins, alginates and others gums.

The amylose product may also be employed as a complexing agent, or fixative, for volatile compounds such as acetaldehyde, cinnamaldehyde, and the like. For example, a compound like acetaldehyde may be complexed by the amylose by adding the acetaldehyde to the diluted solution of amylose following the autoclaving step and just prior to the refrigeration step. When the amylose precipitates during the latter step, it will include or fix the acetaldehyde, that is, the precipitate will comprise an amylose-acetaldehyde complex, and such complex may be recovered at the conclusion of the freeze drying step. It is also possible to recover the amylose-acetaldehyde complex without resorting to the precipitation step, i.e., by direct freezing and freeze drying of the solution containing the amylose-acetaldehyde complex. The complex is characterized by exhibiting the flavor and aroma of the acetaldehyde, and by being readily dispersible in cold and hot water. In hot water the complex breaks down to release the acetaldehyde. Such a complex is useful wherever it is desired to have the acetaldehyde, or other included compound, in a stable form and where a slow release of the compound is wanted.

*Example 1*

This example illustrates the preparation of a freeze dried, cold-water dispersible, hot-water soluble amylose. About 30 grams of potato amylose and 970 cc. of water were blended briefly in a Waring Blendor, then charged to a Parr reaction vessel where the mixture was heated to a temperature of 160° C. at a pressure of 100 p.s.i.g., and the temperature-pressure conditions were maintained for 5 minutes. The contents were cooled to 90° C., after which the vessel was opened and the contents removed. The entire heating and cooling operations required 45 to 60 minutes. The product comprised a 3% solution of amylose in water, and this was then diluted with cold water to a final amylose concentration of 1%, and the resulting solution was refrigerated at 2 to 3° C. for 4 days. At the end of the refrigeration period, the resulting precipitate was separated from the supernatant by centrifugation. The precipitate was slurried with a small amount of cold water in a Waring Blendor, then quickly frozen by means of externally applied Dry Ice-acetone mixture. The frozen material was dehydrated by freeze drying. The resulting product consisted of white, spherical particles about 10 microns in diameter. The intrinsic viscosity of the product was 0.96, and the X-ray diffraction diagram showed the material to be diffusely crystalline. The molecular weight was approximately 70,000.

The product powder was dispersible but not soluble in cold water; however, when 5 grams of the powder were heated in 95 cc. of water to boiling, upon cooling, a white semi-opaque gel resulted. The gel was resolubilizable on heating and regellable on subsequent cooling. The resulting gel was smooth, bland, digestible. In addition, it may be characterized as short or clean cutting, non-stringy, and non-pasty.

The intrinsic viscosity of the amylose product was determined by the following procedure: an exactly weighed amount of product, preferably 0.5 g., was dissolved in 100 ml. of 0.5 normal sodium hydroxide at a temperature of 0 to 2° C. The solubilization was helped by mechanical agitation. The resulting solution was filtered through glass wool and exactly 8 ml. of it was placed in a Cannon-Ubbelohde dilution viscometer No. 100, equilibrated at 30.10° C. The flow times of the solution were determined in triplicate and further dilutions of the same solution were made right in the viscometer with 0.5 normal sodium hydroxide. The flow times of all diluted solutions were also determined in triplicate and at amylose concentrations of 0.4, 0.3, 0.2 and 0.1% by weight. The specific viscosities were calculated from the flow times by means of the following formula:

$$\frac{\text{Specific viscosity}}{C} = \frac{t - t_0}{t_0 C}$$

(where $t$ is the flow time of the solution in seconds, $t_0$ is the flow time of the solvent in seconds, and $C$ is the concentration of amylose in weight percent). The specific viscosities were plotted versus the amylose concentrations and the resulting straight line was extrapolated to 0% concentration. The viscosity at 0% concentration is termed the intrinsic viscosity. As is known, intrinsic viscosity is related to the chain length of the amylose.

The amylose product as prepared in Example 1 may be used as a base for solid bacteriological culture media. For example, a 5% amylose dispersion can be autoclaved in Petri dishes or test tubes, allowed to cool, and the resulting sterile gel can be used as a base for culturing micro-organisms. This base or culture medium has a further advantage of being capable of resolubilization on autoclaving. Organisms which attack amylose are capable of solubilizing this culture medium so that reautoclaving and cooling will not result in gel formation. Such organisms are those in the class of Aspergilli, Saccharomyces, and the like.

*Example 2*

This example illustrates the use of the freeze-dried amylose product in an instant gravy or sauce. Five grams of the freeze-dried amylose as prepared in Example 1 were mixed with 7 grams of dry beef flavor mixture, and the solids were dispersed in 100 cc. of cold water by stirring. The resulting mixture was heated to boiling and immediately removed from the heat. The entire heating procedure required barely 5 minutes. In addition, the resulting gravy was completely smooth and free from lumps and its texture, viscosity, and other physical characteristics were close to those of a brown gravy. Upon cooling, the gravy solidified to a weak gel, which on heating reliquefied to produce the initial gravy.

It has been found that the addition, the rigidity of the gel may be reduced by means of the amylopectin. Suitable amounts of the latter may be used, say up to 20% by weight based on the amylose. The amylopectin may be added at any suitable point in the process, and if desired, may be incorporated with the starting amylose. Pregelatinized starch is also useful in place of amylopectin.

The product is further useful in industrial applications as a starting material or intermediate for the preparation of various amylose derivatives, being particularly valuable where a cold-water dispersible material is desired. Such a material enables the derivative-forming reactions to be carried out at low temperatures owing to its cold-water dispersibility. As is apparent, such cold-water dispersible material, when employed in these low temperature reactions, does not undergo heat degradation as in the case of conventional amyloses.

In connection with the starting amylose material, it may be noted that those materials which are soluble in hot water, say water at 60° C. or above, to give concentrations of about 1 to 25% of amylose by weight, can be introduced directly to the drying step. In other words, being sufficiently hot-water soluble, they need not be subjected to the autoclaving step.

In the same connection, it is possible to autoclave a high intrinsic viscosity amylose under such conditions that practically no degradation of the amylose chains will occur. The desired intrinsic viscosity, that is, from 0.7 to 1.1, may be obtained by subjecting the amylose solution as it comes out of the autoclave to treatment with beta-amylase enzyme for a time up to 24 hours, or until the desired intrinsic viscosity is reached. The resulting solution may then be refrigerated, precipitated, frozen, and freeze dried by the procedure described.

It is to be understood that the invention is not restricted to the specific details of the foregoing description but is capable of obvious variations thereof without departing from its scope.

What is claimed is:

1. The method of producing water-dispersible amylose.

which comprises subjecting a mixture of water and amylose to autoclaving to form a hot aqueous solution containing about 1 to 25% amylose by weight, diluting the solution with water to form a non-gelling amylose solution, cooling the solution to a temperature ranging from room temperature to just above the temperature of ice formation to precipitate the amylose, separating the precipitate from the solution, subjecting the precipitate to freezing conditions, and lyophilizing the precipitate.

2. The method claimed in claim 1, in which said autoclaving is carried out at about 300° to 375° F. and 80 to 140 p.s.i.g. for about 1 to 60 minutes.

3. The method claimed in claim 1, in which said autoclaving is carried out at about 310° to 330° F. and 80 to 140 p.s.i.g., the maximum temperature of said autoclaving being maintained for about 1 to 5 minutes.

4. The method claimed in claim 1, in which the amylose in said hot aqueous solution has an intrinsic viscosity of about 1.0 to 5.0.

5. The method claimed in claim 4, in which the amylose in said hot aqueous solution has an intrinsic viscosity of about 1.7 to 1.8.

6. The method claimed in claim 1, in which said hot aqueous solution contains about 2 to 10% amylose by weight.

7. The method claimed in claim 6, in which said hot aqueous solution contains about 3 to 6% amylose by weight.

8. The method claimed in claim 1, in which said hot aqueous solution is diluted to about 0.1 to 2% concentration by weight of amylose.

9. The method claimed in claim 8, in which said amylose concentration is about 1%.

10. The method claimed in claim 1, in which said amylose solution is cooled to a temperature ranging from room temperature to just above the temperature of ice formation over a period of about 24 to 240 hours.

11. The method claimed in claim 10, in which said amylose solution is cooled to a temperature of about 2° to 3° C. over a period of about 72 to 96 hours.

12. The method of producing water-dispersible amylose, which comprises subjecting a mixture of water and amylose to autoclaving to form a hot aqueous solution containing about 1 to 25% amylose by weight, diluting the solution with water to form a non-gelling amylose solution, cooling the solution to a temperature ranging from room temperature to just above the temperature of ice formation to precipitate the amylose, recovering the precipitate in a moist condition, subjecting the precipitate to freezing conditions, and lyophilizing the precipitate.

13. The method of producing water-dispersible amylose, which comprises subjecting a mixture of water and amylose to autoclaving to form a hot aqueous solution containing about 1 to 25% amylose by weight, diluting the solution with water to form a non-gelling amylose solution, cooling the solution to a temperature ranging from room temperature to just above the temperature of ice formation to precipitate the amylose, separating the precipitate from the solution, slurrying the precipitate with water, subjecting the precipitate to freezing conditions, and lyophilizing the precipitate.

14. Amylose, comprising a dry, porous, white, fluffy powder which has a diffuse, crystalline, X-ray diffraction diagram and a substantially uniform particle size, said amylose being non-toxic and digestible and also ordorless and bland and having a smooth mouth feel, said amylose being dispersible in cold water to form a non-clumping dispersion.

15. Amylose as claimed in claim 14, said amylose being further characterized in that its particles are spherically shaped and have a diameter of about 10 microns.

16. Amylose as claimed in claim 14, said amylose being further characterized in that it has an average intrinsic viscosity of about 0.7 to 1.1.

17. Amylose as claimed in claim 14, said amylose being further characterized in that it is dispersible, hydratable and partly soluble in hot water in concentrations of at least about 0.1% by weight, the hot dispersions forming a heat-reversible gel on cooling.

18. Amylose as claimed in claim 17, said gel being in the form of thin layers which are colorless and translucent, said gel itself being firm and semi-opaque.

19. The amylose of claim 14 having admixed therewith about 1 to 20% amylopectin by weight.

References Cited in the file of this patent

UNITED STATES PATENTS 2,813,796     Keneaster              Nov. 19, 1956

OTHER REFERENCES

Agricultural and Food Chemistry, article by Roseman, vol. 7, No. 11, November 1949, pp. 774–778.

Chem. Abstracts, vol. 52, p. 2437c (1958).

Food Technology, article by Roseman, vol XII, No. 9, 1958, pp. 464–468.

The Chemistry and Tech. of Cereals as Food and Feed, by Matz, Ovi Pub. Co., Westport, Conn., 1959, pp. 452–453.